United States Patent
Bell et al.

(10) Patent No.: US 6,707,268 B1
(45) Date of Patent: Mar. 16, 2004

(54) ALTERNATIVE DRIVE POWER ARRANGEMENT HAVING AN ELECTRIC MOTOR WITH MULTIPLE ARMATURES

(75) Inventors: Dale K. Bell, Ortonville, MI (US); Dennis A. Kramer, Troy, MI (US); Clive Harrup, Beds (GB); Mehmet S. Ciray, Glenwood, IN (US); Silvio M. Yamada, Gahanna, OH (US); Dean M. House, Pataskala, OH (US); David K. Platner, Shelby, MI (US); Dale J. Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/271,458

(22) Filed: Oct. 15, 2002

(51) Int. Cl.⁷ .................................................. H02P 1/00
(52) U.S. Cl. ........................ 318/494; 318/376; 318/759
(58) Field of Search ................................. 318/376, 139, 318/254, 759, 370, 494; 310/103, 66

(56) References Cited

U.S. PATENT DOCUMENTS

| | | | |
|---|---|---|---|
| 4,655,255 A | * 4/1987 | Rode | ........................ 137/627.5 |
| 5,514,925 A | * 5/1996 | Worthington et al. | ....... 310/103 |
| 5,789,896 A | 8/1998 | Fischer et al. | |
| 6,081,042 A | 6/2000 | Tabata et al. | |
| 6,205,379 B1 | 3/2001 | Morisawa et al. | |
| 6,288,508 B1 | 9/2001 | Taketomi et al. | |

* cited by examiner

Primary Examiner—Karen Masih
(74) Attorney, Agent, or Firm—Carlson, Gaskey & Olds

(57) ABSTRACT

A system for providing driving torque to wheels on a vehicle includes an electric motor having the capability of independently driving rotatable axle shafts. One example includes a single stator with a first armature associated with a first axle shaft and a second armature associated with a second axle shaft. A controller independently controls power to the armatures to achieve the desired wheel speed or driving torque at each of the wheels.

20 Claims, 1 Drawing Sheet

ALTERNATIVE DRIVE POWER ARRANGEMENT HAVING AN ELECTRIC MOTOR WITH MULTIPLE ARMATURES

BACKGROUND OF THE INVENTION

This invention generally relates to electric motors. More particularly, this invention relates to an electric motor arrangement within a vehicle drive assembly.

Conventional automotive vehicles have been powered by an internal combustion engine that provides driving torque to one or more sets of wheels to propel the vehicle as desired. Recent trends have been to incorporate other sources of motive power in place of or as a supplement to the internal combustion engine. One such example is an electric hybrid vehicle that utilizes an internal combustion engine power or electric power. One shortcoming of such alternative power arrangements is that the potential benefits are limited by the ability to incorporate such systems onto a vehicle. Designs accommodating alternative power sources are typically heavily dependent on current vehicle component configurations. Limited available space and component designs present serious challenges to effective integration of alternative drive arrangements.

There is a need for alternative arrangements of supplemental or alternative power devices on vehicles so that appropriate control can be accomplished within vehicle packaging constraints. This invention addresses that need and provides a unique arrangement for providing driving torque to one or more wheels of a vehicle

SUMMARY OF THE INVENTION

In general terms, this invention is an axle assembly having an electric motor with more than one armature so that more than one motor speed is available to independently provide torque to independently rotatable axle shafts.

One example axle assembly designed according to this invention includes a first axle shaft. A second axle shaft is supported to rotate independently of the first axle shaft. An electric motor includes a stator, a first armature and a second armature. Each armature is associated with one of the axle shafts. A controller controls power to the armatures to independently cause the desired rotation of the first and second axle shafts, respectively.

An electric motor assembly designed according to this invention provides features that are analogous to a mechanical differential gear assembly.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
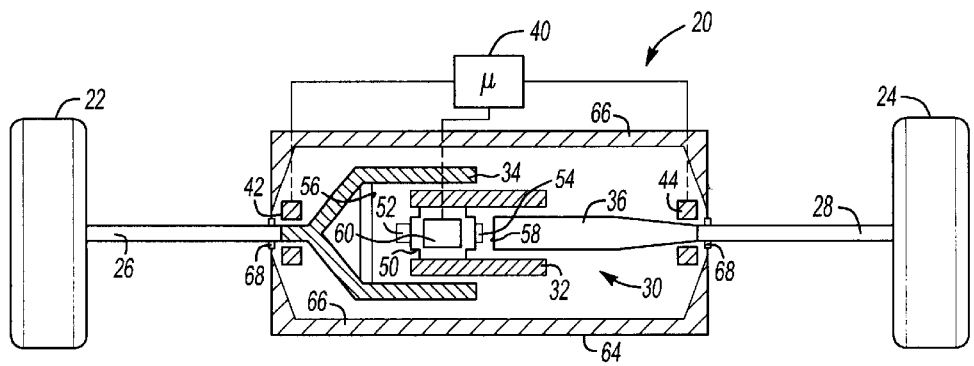
FIG. 1 schematically illustrates a system designed according to this invention.

FIG. 1 schematically illustrates, in partial cross-sectional view, a vehicle axle drive system 20 for providing driving torque to wheels 22 and 24. The system 20 includes a first axle shaft 26 associated with the wheel 22 and a second axle shaft 28 associated with the wheel 24. The axle shafts 26 and 28 can be supported on a vehicle in a selected, conventional manner so that the axle shafts are independently rotatable. An independent suspension configuration is preferred so that the power assembly (described below) can be mounted to the vehicle chassis, reducing unsprung mass.

The inventive arrangement allows for different rotational speeds between the wheels 22 and 24 to accommodate turning or other driving conditions, for example.

An electric motor 30 selectively provides driving torque to the axle shafts 26 and 28 to cause the desired rotation of the wheels 22 and 24. The electric motor 30 may be used as the primary source of driving torque to the axle shafts. Alternatively, the electric motor 30 may be used to supplement the driving force normally provided by an internal combustion engine (not illustrated) through a conventional drive shaft arrangement (not illustrated). Accordingly, the electric motor 30 may be the primary source of driving torque at all times, at selected times, or a supplemental source of driving torque, depending on the particular vehicle configuration.

Electric motor 30 includes a stator 32 that is configured in a generally conventional manner. A first armature 34 is supported to rotate relative to the stator 32. A second armature 36 is supported to rotate relative to the stator 32 independently of the first armature 34 and, when desired, relative to the armature 34. The stator 32 and armatures 34 and 36 comprise known components so that known electric motor technology provides the desired relative rotations as needed. The stator 32 preferably is supported to remain in a fixed position relative to the vehicle frame (not illustrated).

A controller 40 independently controls power supply to the armatures 34 and 36 to achieve the desired rotation of each. A first commutator and brush arrangement 42 allows the controller 40 to control the movement or operation of the first armature. A second commutator and brush arrangement 44 allows the controller 40 to independently control the armature 36. Depending on the particular driving conditions and the need for torque at the wheels 22 and 24, the controller 40 causes an appropriate response at the armatures 34 and 36 to achieve the needed driving torque and speed at the wheels.

For example, during a turn the wheel 22 may need to rotate faster than the wheel 24. Receiving appropriate information, such as wheel cut, the controller 40 preferably is programmed to respond to such a scenario by causing the armature 34 to rotate faster than the armature 36. Under most driving conditions, the controller 40 will tend to keep the armatures 34 and 36 rotating at the same speed. When undesirable slip between the wheels 22 and 24 occurs, the controller 40 preferably is programmed to respond to such a situation by causing the armatures 34 and 36 to rotate so that the appropriate driving torque is distributed between the wheels 22 and 24.

The electric motor assembly 30 provides the capability of operating analogous to a mechanical differential gear arrangement. The independent armatures 34 and 36 allow for independent rotation of the wheels 22 and 24 or, when desired, to have the wheels locked to rotate in unison.

The illustrated example of FIG. 1 includes having a portion of the first armature 34 received around the stator 32. A portion of the armature 36 is received within the stator 32. Another arrangement is shown schematically in FIG. 2 where both armatures 34' and 36' are at least partially received within the stator 32. Still another alternative is shown in FIG. 3 where the armatures 34" and 36" are both at least partially received around the stator 32.

Figure 2:
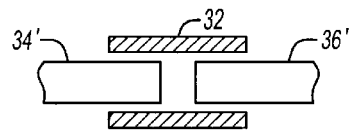
FIG. 2 schematically illustrates selected portions of an alternative embodiment.
Figure 3:
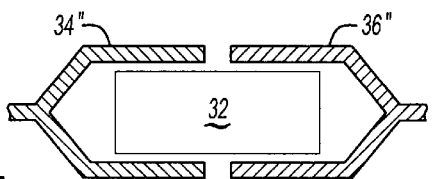
FIG. 3 schematically illustrates selected portions of another alternative embodiment.

In the illustrated examples of FIGS. 1–3, some axial spacing between the armatures is maintained to minimize possible interference between the magnetic fields associated with the respective armatures interacting with the stator 32. Those skilled in the art who have the benefit of this description will realize that a variety of electric motor configurations are within the scope of this invention.

Another feature of the illustrated example is a parking brake feature. A parking device 50 includes engaging members 52 and 54 that selectively engage corresponding surfaces 56 and 58, respectively on the armatures 34 and 36. A mover 60, such as a solenoid, preferably is controlled by the controller 40 to cause selective engagement between the engaging members 52 and 54 and the corresponding armatures. By moving the engaging members into engagement with the corresponding surfaces, the armatures can be locked so that no relative rotation is permitted between the armatures and the stator 32. Because the stator 32 preferably is supported in a fixed position relative to the vehicle frame or chassis, the wheels 22 and 24 are effectively locked in position, thereby providing a parking brake function.

The illustrated example of FIG. 1 includes a housing 64 within which the electric motor 30 is supported. A portion of the illustrated housing is configured to contain a power supply 66 such as a battery or fuel cell. In one example, the power source 66 is effectively distributed around the motor 30 within the housing 64 to minimize the packaging and size of the housing 64 and the overall assembly. Conventional sealing arrangements 68 prevent contamination from entering the housing 64 while still accommodating the rotation of the axle shaft 26 and 28.

Another feature of the inventive arrangement is that one or more of the armatures can be used as a regenerative power source for recharging the power supply 66. During coasting or braking, for example, the controller 40 switches one or more of the armatures into a regenerative mode so that the armature is used to generate current that is then provided to the power supply 66 to recharge the battery or fuel cell, for example. Those skilled in the art who understand electric motor technology will realize how to implement such a feature, given this description.

Additionally, the controller 40 may control one or more of the armatures to provide a braking force to a corresponding wheel as desired. Accordingly, the requirements for mechanical brakes on a vehicle incorporating a system designed according to this invention may be reduced, providing further economical advantages.

To the extent that any gear reduction is required between the output of the armatures 34 and 36 and the wheels 22 and 24, appropriate gear reduction arrangements (not illustrated) may be incorporated as part of the axial assembly or wheel hub assemblies, for example.

Figure 4:
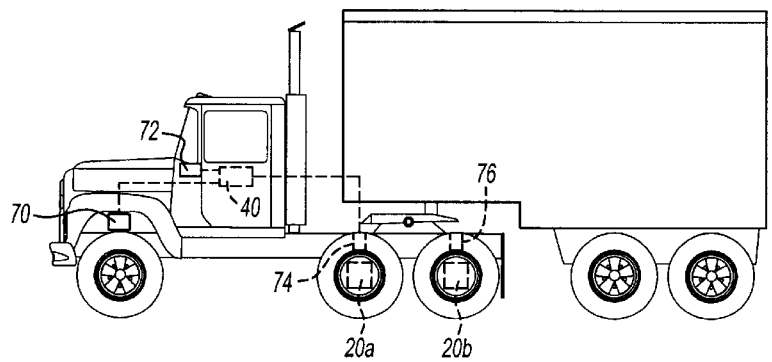
FIG. 4 schematically illustrates a vehicle incorporating a system designed according to this invention.

FIG. 4 schematically illustrates one example vehicle incorporating a system designed according to this invention. The controller 40 gathers information from a plurality of sensors 70, 72, 74 and 76 that provide indications regarding the current driving conditions of the vehicle. Example sensors include wheel speed sensors, steering angle sensors and an overall vehicle speed sensor. The controller 40 preferably is programmed to receive the information from the various sensors and to responsively control the electric motor 30 to provide the desired torque distribution between the wheels 22 and 24.

In the illustration of FIG. 4, the vehicle includes more than one drive axle so that a first electric motor axle assembly arrangement 20A is associated with one set of wheels and a second electric motor drive assembly 20B is associated with a second set of wheels. In such an arrangement, the controller 40 preferably is programmed to not only independently control the opposite wheels of the set but also to independently control each wheel set as may be necessary to achieve the desired amount of torque distribution.

The inventive arrangement provides the ability to incorporate an alternative power source for driving the wheels of a vehicle. Additionally, the inventive arrangement provides the capability of operating as a replacement for a mechanical differential gear arrangement, a driving torque power source and a braking force applicator. Moreover, the inventive arrangement allows for better integrating alternative power arrangements onto a vehicle within typical packaging constraints because it does not necessarily rely upon all of the required features of a conventional driveline assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An axle assembly, comprising:
   a first axle shaft;
   a second axle shaft that is supported to rotate independently of the first axle shaft;
   an electric motor having a stator and a first armature associated with the first axle shaft and a second armature associated with the second axle shaft; and
   a controller that controls movement of the first armature independent from movement of the second armature to achieve a desired rotation of the first and second axle shafts, respectively.

2. The assembly of claim 1, wherein the controller controls a power supply to each armature to cause the respective armatures to rotate according to the desired corresponding axle shaft rotation.

3. The assembly of claim 1, wherein the controller controls the armatures to selectively apply a braking force resisting rotation of the corresponding axle shaft.

4. The assembly of claim 3, including a power source and wherein at least one of the armatures selectively generates current to provide a charge to the power source when applying the braking force.

5. The assembly of claim 1, wherein the stator is generally cylindrical, the first armature is at least partially received within the stator and the second armature is at least partially received around an outside of the stator.

6. The assembly of claim 1, wherein the first and second armatures are each received at least partially around an outside of the stator and the armatures are axially spaced from each other.

7. The assembly of claim 1, including a first commutator associated with the first armature and a second commutator associated with the second armature and wherein the controller communicates with each of the commutators to independently control the armatures.

8. The assembly of claim 1, including a locking device that selectively locks at least one of the armatures to the stator to prevent relative rotation between the armature and the stator.

9. The assembly of claim 8, wherein the locking device includes an engaging member that mechanically locks the armature to the stator and a mover that selectively moves the engaging member into the mechanically locking position.

10. The assembly of claim 1, including a housing within which the electric motor is supported, the housing being supported on a vehicle, the stator being supported within the housing to remain stationary relative to the housing, and including a power source supported within the housing.

11. A vehicle drive control system, comprising:
   a first axle shaft;
   a second axle shaft that is supported to rotate independently of the first axle shaft;
   at least one sensor that provides an indication of a driving condition of the vehicle;
   an electric motor having a stator, a first armature associated with the first axle shaft and a second armature associated with the second axle shaft; and
   a controller that controls movement of the first armature independent from movement of the second armature to achieve a desired rotation of the first and second axle shafts, respectively, the controller using the indication from the sensor when determining how to control the armatures.

12. The system of claim 11, wherein the controller controls the armatures to selectively apply a braking force resisting rotation of the corresponding axle shaft.

13. The system of claim 12, including a power source and wherein at least one of the armatures selectively generates current to provide a charge to the power source when applying the braking force.

14. The system of claim 11, including a plurality of sensors that provide a plurality of indications to the controller including an indication of steering angle, an indication of wheel speed and an indication of vehicle speed and wherein the controller controls the armatures responsive to the sensor indications.

15. The system of claim 11, wherein the stator is fixed relative to a frame of the vehicle and including a locking device that selectively locks at least one of the armatures to the stator to prevent relative rotation between the armature and the stator.

16. The system of claim 15, wherein the locking device includes an engaging member that selectively engages a corresponding surface on a corresponding one of the armatures to lock the armature relative to the stator and a mover that selectively moves the engaging member into engagement with the corresponding surface responsive to a command from the controller.

17. A method of controlling rotation of two vehicle wheels aligned on an axis, comprising the steps of:
   providing an electric motor having a stator and two armatures associated with the stator such that a first one of the armatures rotates with one of the wheels and a second one of the armatures rotates with the other of the wheels; and
   independently controlling the armatures to achieve a desired rotation of each of the wheels, respectively.

18. The method of claim 17, including independently powering the armatures to provide a desired amount of driving torque to each of the wheels.

19. The method of claim 17, including selectively switching at least one of the armatures to generate electrical energy responsive to rotation of the corresponding wheel and providing the generated energy to a power supply on the vehicle.

20. The method of claim 17, including selectively controlling at least one of the armatures to provide a braking force to control a speed of rotation of the corresponding wheel.

* * * * *